(12) United States Patent
Narayana et al.

(10) Patent No.: US 9,125,046 B1
(45) Date of Patent: Sep. 1, 2015

(54) SUBSCRIBER ACTIVITY MAP

(71) Applicant: NetScout Systems, Inc., Westford, MA (US)

(72) Inventors: Chittaranjan Narayana, Bangalore (IN); Bhanuprakash Magadi, Bangalore (IN); Amreesh Agrawal, Bangalore (IN)

(73) Assignee: NetScout Systems, Inc., Westford, MA (US)

( * ) Notice: Subject to any disclaimer, the term of this patent is extended or adjusted under 35 U.S.C. 154(b) by 57 days.

(21) Appl. No.: 13/753,482

(22) Filed: Jan. 29, 2013

(51) Int. Cl.
*H04M 11/00* (2006.01)
*H04W 4/26* (2009.01)

(52) U.S. Cl.
CPC .................................... *H04W 4/26* (2013.01)

(58) Field of Classification Search
CPC ............ H04W 92/08; H04M 1/72519; H04M 1/72522; H04M 1/72544; H04L 43/12; H04L 41/22; H04L 41/0896; H04L 43/0888; H04L 43/0882; H04L 43/045; H04L 41/24; H04L 41/142; H04L 43/02
See application file for complete search history.

(56) References Cited

U.S. PATENT DOCUMENTS

| | | | | |
|---|---|---|---|---|
| 5,867,483 | A * | 2/1999 | Ennis et al. | 370/252 |
| 7,649,450 | B2 * | 1/2010 | Campion et al. | 340/514 |
| 7,689,567 | B2 * | 3/2010 | Lock et al. | 707/999.01 |
| 7,973,655 | B2 * | 7/2011 | Blinnikka et al. | 340/539.13 |
| 8,136,162 | B2 * | 3/2012 | Akyol et al. | 726/24 |
| 8,351,958 | B2 * | 1/2013 | Yoshioka | 455/456.1 |
| 2013/0223421 | A1 * | 8/2013 | Gundavelli et al. | 370/338 |

FOREIGN PATENT DOCUMENTS

| | | | | |
|---|---|---|---|---|
| WO | WO 2012/044449 A1 | * | 9/2011 | G06F 21/552 |
| WO | WO 2012044449 A1 | * | 4/2012 | |

OTHER PUBLICATIONS

Leith, "Workload Heatmap with Tableau" (URL—http://support.uptimesoftware.com/community/?showtopic=81).*
DataVisualization.ch,"NBA Team Heatmaps," 2013, two pages. [Online] [Retrieved Jul. 31, 2013] Retrieved from the Internet <URL: http://datavisualization.ch/showcases/nba-team-heatmaps/.>.
OpenHeatMap.com, "OpenHeatMap Gallery," 2013, two pages. [Online] [Retrieved Jul. 31, 2013] Retrieved from the Internet <URL: http://www.openheatmap.com/gallery.html.>.
The Measurement Factory, "Gallery of IPV4 Heatmaps," 2013, two pages. [Online] [Retrieved Jul. 31, 2013] Retrieved from the Internet <URL: http://maps.measurement-factory.com/gallery/index.html.>.

* cited by examiner

*Primary Examiner* — Jinsong Hu
*Assistant Examiner* — Tabla Glomah
(74) *Attorney, Agent, or Firm* — Fenwick & West LLP

(57) ABSTRACT

Connection activity between a device and service provider's network is monitored. Connection parameters calculated based on the connection activity are stored. An activity map is generated to capture and display the connection parameters which indicate activity or repeated patterns of activity over time. The activity utilizes a time grid to display a plurality of parameter regarding device status and activity. The x-axis of the time grid divides a time period into portions of time at a first time length. The y-axis of the time grid divides the portions of time at the first time length into smaller lengths of time at a second time length. Multiple layers of indicators are used in the time grid to indicate the status of several parameters during the same time period.

20 Claims, 5 Drawing Sheets

SUBSCRIBER ACTIVITY MAP

FIELD OF THE INVENTION

The invention relates generally to mobile network and application monitoring. More specifically, the invention relates to tracking the activity and behavior of user equipment in a cellular network.

BACKGROUND OF THE INVENTION

Users of mobile devices on a cellular network utilize a variety of handset models which each have their own behavior and method of connecting to a cellular radio network and accessing the services hosted. For example, connection behavior includes when, how often, and for what duration devices acquire, use and relinquish a radio link when connecting to and accessing services hosted by a service provider. In addition, specific applications running on handsets may cause devices to exhibit additional or modified connecting behaviors. Connecting behaviors may also be influenced by the topography and geography of the area near the connecting device. It is valuable for the service provider or telecom operator to understand and identify how an individual subscriber device is used and what connection behaviors it exhibits. This can enhance the ability of the service provider to provide a satisfactory quality of service to the device ensuring a quality connection without wasting unnecessary bandwidth.

SUMMARY

An activity map is generated to capture and display multiple parameters which indicate an activity or repeated pattern of activity over time. The activity map utilizes a time grid to display a plurality of parameters regarding device status and activity. In one embodiment, the x-axis of the time grid divides a time period into portions of time at a first time length. The y-axis of the time grid divides the portions of time at the first time length into smaller lengths of time at a second time length. For example, each column of the time grid may correspond to a one minute period of time, while each row of a time grid may correspond to a 15 second period of time within the 1 minute periods of time organized into time grid columns.

Each parameter, dimension or characteristic identified by the activity map may be presented utilizing a different visual layer. For example, each parameter indicates a certain property and may be identified with specific colors or patterns displayed at a time grid location. A change in color or pattern may indicate an approximate point in time at which the parameter was altered. Change in colors and patterns across the time grid indicates varying usage, location status, or state of a device managed by a service provider. In one embodiment, all parameters displayed in the activity map on a single screen correspond to a single user device.

The parameters identified in the activity map can aid the service provider in assessing the status of a device. For example, whether a device behaves as expected by connecting to the network for a proper amount of time can be determined. Further, it can be analyzed whether a device is being disconnected prematurely due to actual connection issues or any other related issues being utilized by the device. This sort of information can aid the service provider in determining what, if any, network modifications need to be made to enhance connectivity.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figs. depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the present invention is now described with reference to the Figs. where like reference numbers indicate identical or functionally similar elements. Also in the Figs., the left most digits of each reference number corresponds to the FIG. in which the reference number is first used.

Figure 1:
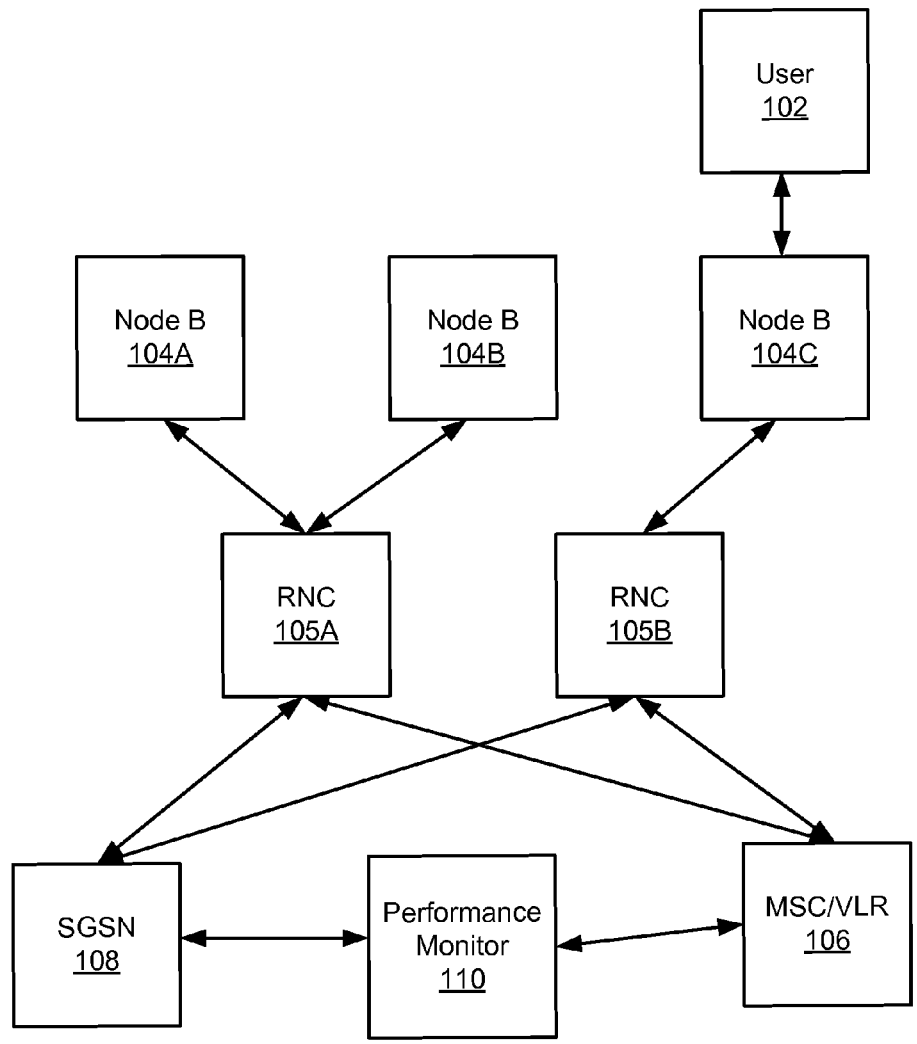
FIG. 1 is an illustration of a system from which data may be gathered for the disclosed subscriber activity map according to one embodiment.

FIG. 1 is an illustration of a system from which data may be gathered for the disclosed subscriber activity map, the system 100 including a user device 102, Node Bs 104, Radio Network Controllers (RNCs) 105, mobile switching center (MSC) and visitor location register (VLR) 106, and serving GPRS support node 108. While an example embodiment is illustrated in FIG. 1, alternate embodiments may feature various numbers of any component in FIG. 1, such as user devices 102, SGSN 108, and Node B 104. Node Bs 104 are hardware that communicate to a user device on a network.

A user device 102 may communicate with one or more Node Bs 104 based on availability and location. An RNC 105 is responsible for governing the Node B(s) 104 that are connected to it. The RNC 105 is responsible for resource management and may encrypt data before it is transmitted to and from a user device 102. A SGSN 108 is responsible for the delivery of data to and from RNCs 105. The SGSN 108 is configurable to control tasks including routing and transferring of packets and mobility management. A location register of the SGSN 108 may store location information including the current cell and virtual location register associated with a user device 102, as well as user profiles of all GPRS users registered with the SGSN 108.

In one embodiment, the interface between the RNCs 105 and the SGSN 108 is an IuPS interface. In one embodiment, the RNCs 105 are also configured to communicate with the MSC and VLR 106. The MSC is configurable to route voice calls, SMS and other services while the VLR stores information on subscribers or users who communicate through the MSC which the VLR servers. Stored subscriber information may include an associated international mobile subscriber identity (IMSI), authentication data, and services that the subscriber is permitted to access. The MSC/VLR 106 and the SGSN 108 are further configurable to connect to broader external networks which may include a public switched telephone network (PSTN), integrated services digital network (ISDN), and internet or intranet network.

A performance monitor 110 monitors the activity of the user device 102. An example of a performance monitor is the nGenius service solution including the nGenius analysis modules and sniffer analysis module that are commercially available from NetScout Systems, Westford, Mass. In one embodiment, the performance monitor manages one or more probes that interface with the connection between the user device 102 and the SGSN 108 or MSC/VLR 106. Probes may be placed at the end point of a connection or at any intermediary location at provide any number of parameters that are reported as part of the activity map by the performance monitor 110. For example, in one embodiment, performance monitor 110 configures heuristic parameters at the probes and collects statistics on traffic analyzed by the probe 112. It may be beneficial to place multiple probes along a network path to assess stream degradation. In addition to gathering data from probes, the performance monitor 110 may receive connection information from the SGSN 108 and/or GGSN 111. The performance monitor 110 utilizes gather information to generate an activity map that is displayed to the service provider, user, or other party.

Figure 2:
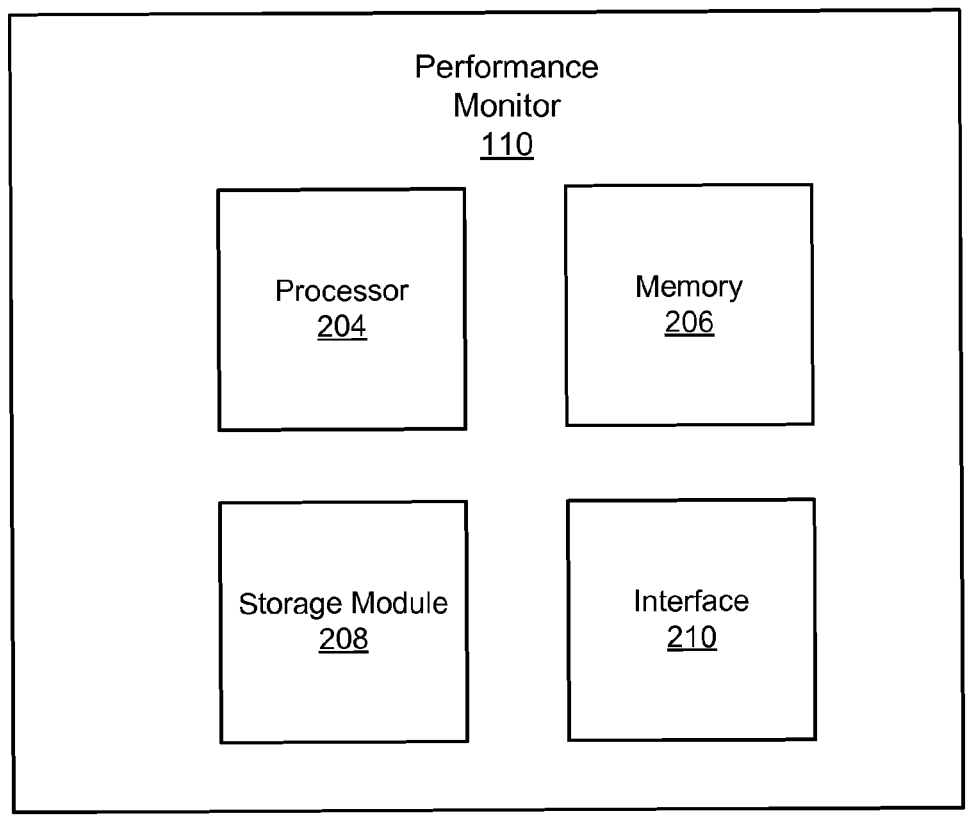
FIG. 2 is an illustration of a block diagram of a performance monitor in accordance with one embodiment of the invention

FIG. 2 is an illustration of a block diagram of a performance monitor 110 for gathering connection parameters and generating an activity map, in accordance with one embodiment of the invention. Performance monitor 110 may include, among other components, a processor 204, memory 206, a storage module 208, and an interface 210, e.g., an interface for communicating with external systems and/or networks, for example. Applications are executed using processor 204 and can be received via the interface 210, stored in memory 206, stored in a storage device 208 or by using a combination of these elements. In other embodiments, other conventional ways to store and update applications are used. For ease of discussion, in the embodiment illustrated in FIG. 2 applications are stored in the storage module 208. The performance monitor 110 may also include other components such as user input devices (e.g., keyboard and mouse) and display devices (e.g., a display driver card).

The processor 204 executes computer instructions stored in the memory 206 and/or the storage module 208. Although only a single processor is illustrated in FIG. 2, two or more processors may be used to increase the computing capacity and the processing speed of the performance monitor 110.

The memory 206 is a computer readable storage medium that stores, among other data, computer instruction modules for processing, storing and/or retrieving the network data. In one embodiment, the memory 206 is a primary storage device (e.g., Random-Access Memory (RAM)) having a faster access speed compared to the storage module 208. In an embodiment, the performance monitor 110 is able to capture data from the network or probes via the interface 210 transparently. That is, without significantly affecting the communication between devices on either end of a communication path.

The storage module 208 may be a secondary storage device for storing, among others, the raw or processed network data, current and previously generated activity maps, etc. The storage module 208 may be embodied, for example, as a solid-state drive, hard disk or other non-volatile memory devices capable of storing a large amount of data compared to the memory 206.

The interface 210 may include a NIC (network interface card) or other standard network interfaces to receive network data, and to communicate with other network interface devices coupled to a network. For example, the interface 210 may be an Ethernet interface, a WiFi (IEEE 802.11) interface, or other types of wired or wireless network interfaces. In one embodiment, two or more network interfaces may be used to communicate with different types of networks or perform specialized functions. For example, one network interface may be used to communicate with the SGSN 108 and a second network interface may be used to collect data for analysis from probes.

The components of the performance monitor 110 of FIG. 2 are merely illustrative. In alternative embodiments, the storage module 208, for example, may be omitted. In this embodiment, all the information is stored in the memory 206.

Figure 3:
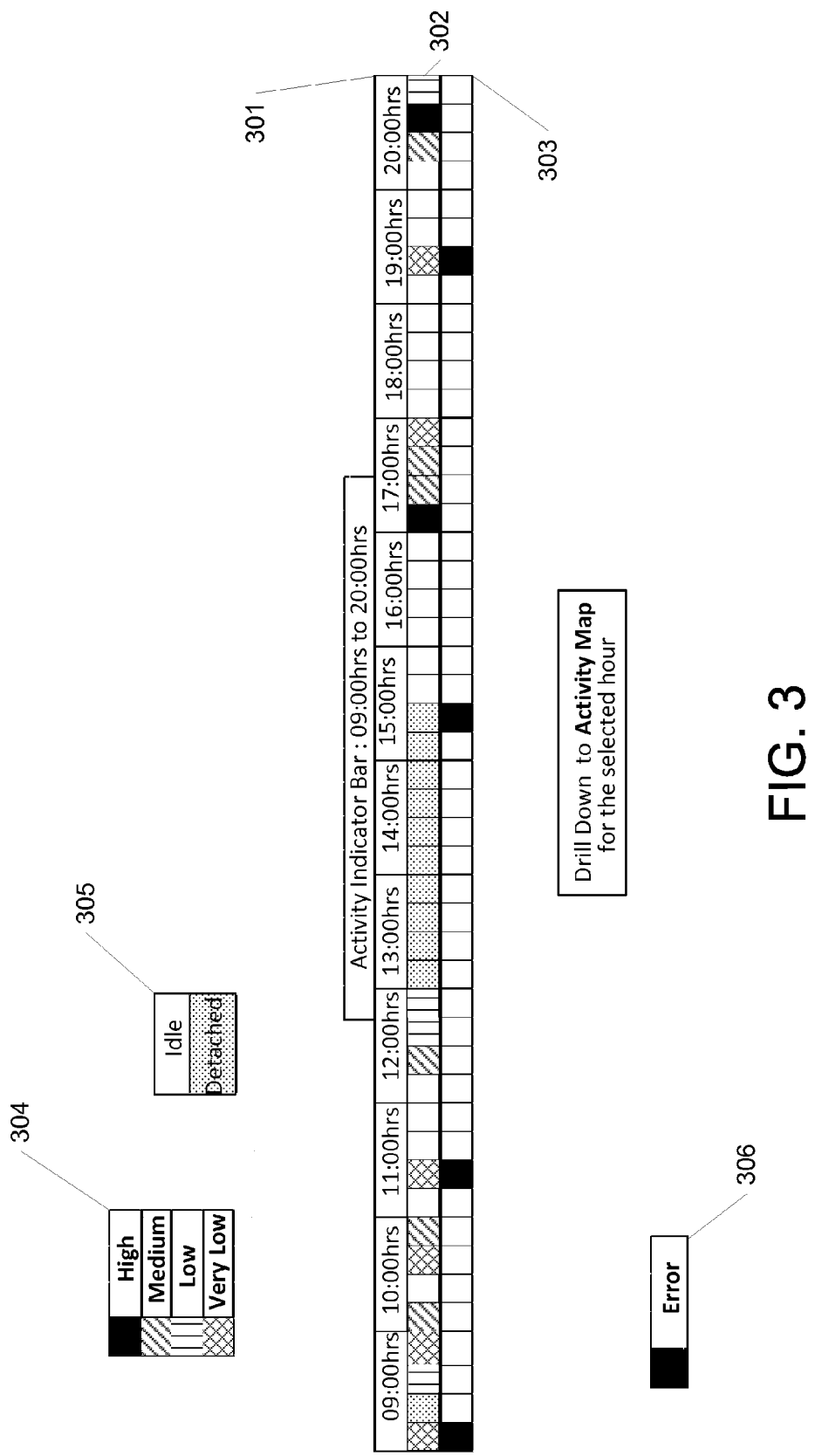
FIG. 3 is an illustration of an activity indicator bar according to one embodiment.
Figure 4:
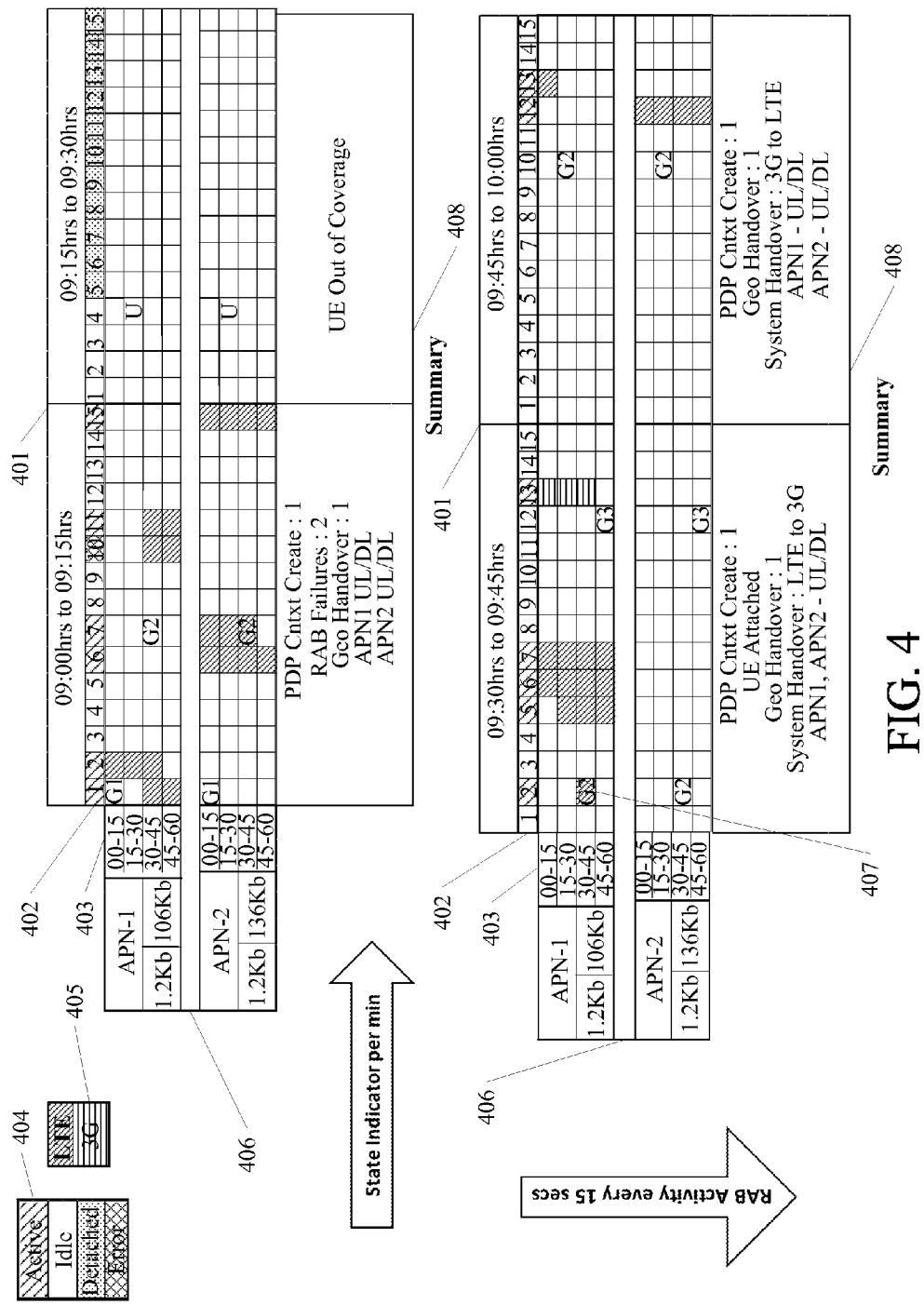
FIG. 4 illustrates an activity map for a period of time selected from the activity indicator bar in accordance with one embodiment.

FIG. 3 is an illustration of an activity indicator bar according to one embodiment. In one embodiment, the activity indicator bar of FIG. 3 is displayed simultaneously with the activity map illustrated in FIG. 4. The activity indicator bar of FIG. 3 and activity map of FIG. 4 are separated into separate FIGS. in order to more clearly discuss the details of each, but they may be displayed simultaneously. The activity indicator bar displays connection information over a large period of time. For example, FIG. 3 displays connection information from 9:00 to 20:00 or over a period of 11 hours. Each hour that is included in the activity indicator bar is listed in the hour overview row 301. The hour overview row 301 lists each hour individually that is included in the activity indicator bar. While example time lengths are used for clarity, the activity indicator bar may use other time lengths for any segment of the activity indicator bar. Similarly, the activity map of FIG. 4 may use alternative time lengths for any portion of the activity map. In one embodiment, time lengths for any portion of an interface may be adjustable by a user of the performance monitor 110.

The activity level row 302 divides each hour into 15 minute segments, with each 15 segment represented by a box. In each of the boxes representing a 15 minutes segment of time, the overall activity level rating of the 15 minute time segment is presented. The activity level legend 304 indicates the level of network activity that occurred during a time period between the network and the user device. For example, in FIG. 3, a solid pattern indicates a high activity level, a diagonal pattern indicates a medium activity level, a vertical pattern indicates a low activity level, and a cross hatch pattern indicates a very low activity level. These activity levels are calculated based on the activities and parameter changes that occur within the given time period. In one embodiment, the activity levels are calculated based on the information displayed on the corresponding activity map illustrated in FIG. 4. In one embodiment, rather than being identified by pattern in a grid location, the activity levels may be indicated by coloring individual boxes of the activity level row 302.

In addition to indicating a high, medium, low or very low level of activity, the activity level row 302 may indicate an Idle, Active, or Detached state. As illustrated, an idle state is indicated by a blank box in the activity level row 302 with no color or pattern and a detached state is indicated by a dotted box as detailed in the state legend 305. An idle state indicates that a valid connection is made between the user device and the network, but not enough activity has occurred to be classified as a very low or higher activity level. A detached state indicates that the user device has been, or appears to have been detached from the network and no activity can occur between the user device and network. In one embodiment, the activity level row 302 may indicate that a device has had a level of activity as well a detached state. This may occur, for example, if an amount of activity exceeding a threshold occurs during a time segment identified by a single box of the activity level row 302 and the device enters a detached state during the same time segment.

The last row of the activity indicator bar is the error indication row 303. As indicated by the error legend 306, a fully shaded box in the error indication row 303 indicates that an error occurred during the corresponding time period. This can aid the user of the activity map to know which period of time to focus on when assessing connection performance. In one embodiment, interacting with an hour label in the hour overview row 301 results in the corresponding activity map opening which describes network activity occurring during hour that is interacted with.

FIG. 4 illustrates an activity map for a period of time selected from the activity indicator bar in accordance with one embodiment. As illustrated, FIG. 4 illustrates an activity map corresponding to the 9:00 to 10:00 time period of the activity indicator bar. A time segment overview row 401 divides the time period into a plurality of time segments. In the illustrated embodiment, the hour represented by the activity map is divided into four 15 minute segments. The state indicator row 402 divides each 15 minute time segments into one minute intervals. For each 15 minutes interval, there are 15 boxes in the state indicator row 402. The state indicator legend 404 indicates the states identified in the state indicator row 402. An active state is represented by a diagonal pattern, an idle state is represented by a blank box or grid location, a detached state is represented by a diagonal pattern, and an error state is represented by a cross hatched pattern. All states are illustrated in the example of FIG. 4. The only error state occurring in the activity map occurs at the 9:10 time grid location of the activity indicator row 402. This corresponds to the error indication presented in the activity indicator bar illustrated in FIG. 3.

Column 403 indicates 15 segment time intervals which each minute in the activity indicator row 402 divided into 4 rows, each representing 15 seconds, for each minute of the hour in the activity map. It should be noted that two access point names are included APN-1 and APN-2. Each access point name is communicating with the user device for which the activity map is generated. Any number of APNs may be included in the activity map. Separate activity data for each APN results in a total of 8 activity rows in the time grid, 4 for each APN. Additionally, the activity map lists an upload and download speed for each APN in area 406. As illustrated, each APN has an upload speed of 1.2 kb/sec while APN-1 has a download speed of 106 kb/sec and APN-2 has a download speed of 136 kb/sec.

If activity occurs during a 15 second portion of the time grid, the wireless communication standard, or interface, over which the activity took place is identified based on interface legend 405. In this instance, an LTE interface is represented by a diagonal pattern and a 3G interface is represented by a horizontal pattern. While only LTE and 3G interfaces are encompassed by the example of FIGS. 3 and 4, alternative network standards such as 2.5G, HSPA+, CDMA2000, and UMTS may be included in an activity map. The activity map can identify over which interface activity took place by the pattern that is placed on the corresponding time grid location box.

In addition to activity interface, the activity map can represent the geographic location at which a user device is located. Geographic location can be determined based on the cell towers which the user device connects to, self-reported by a GPS locator present on the user device, or through any other well known means. As illustrated G1, G2, and G3 represent three geographic regions that may partially overlap. A time grid location with G1 in the box indicates that the device is located in geographic region 1 and remains there until a change in geographic regions is identified. In FIG. 4, the user device begins in G1 and transitions to G2 before the geographic region becomes unknown (U). The geographic region is then again identified as G2 before transitioning to G3 and then back again to G2. For instance, time grid location 407 describes the activity occurring at 9:01:30 through 9:01:45 through APN-1. At location or box 407, activity is occurring via LTE and the geographic region transitions from unknown (U) to geographic region 2 (G2).

In one embodiment, the current geographic region for each location in the time grid may be indicated by shading in each box with a background color. For example, G1, G2, G3, and U may correspond to red, blue, green, and white backgrounds, respectively. This allows multiple layers of activity and parameter data to be included in a single time grid location or box. For example, interface type or activity level may be identified through a pattern while geographic location is identified by a background color.

In addition, a summary row 408 summarizes the activity occurring during the corresponding time period. For example, during the 9:00 to 9:15 time period, a packet data protocol context was created containing the subscriber's session information, 2 RAB failures occurred, 1 geographic handover occurred from G1 to G2, and upload and download activity occurred over APN-1 and APN-2. During the 9:15 to 9:30 time period, the user device was out of coverage and no activity occurred. During the 9:30 to 9:45 time period, a PDP context was created, the user device was attached, a geographic handover occurred, a system interface handover occurred, and upload and download activity occurred over APN-1 and APN-2. During the 9:45 to 10:00 time period, a PDP context was created, a geographic handover occurred, a system handover occurred, and upload and download activity occurred over APN-1 and APN-2.

Figure 5:
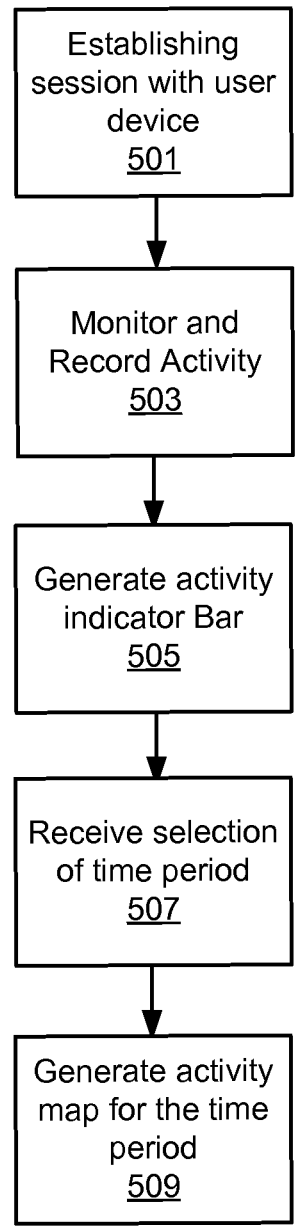
FIG. 5 is an illustration of a flow chart for generating an activity map according to one embodiment.

FIG. 5 is an illustration of a flow chart for generating an activity map according to one embodiment. A session is established 501 between a network and a user device. While the session is active, activities related to the user device are monitored and recorded 503 by the performance monitor 110. The performance monitor 110 generates 505 an activity indicator bar which describes actions and parameters related to the user device at a high level over a period of time. The performance monitor 110 receives 507 an interaction selecting a subset of the period of time and generates 509 an activity map describing actions and parameters related the user device at a more detailed level during the subset of the period of time. A user of the performance monitor 110 may subsequently select alternative subsets of time to generate corresponding activity maps. In one embodiment, a user of the performance monitor 110 is a network administrator of a service provider.

Generation of a subscriber activity map allows a service provider to analyze detailed information on an individual subscriber and assess performance of the subscriber's device. An activity map may be utilized in other applications and systems, e.g., nGENIUS PERFORMANCE MANAGER AND NGENIUS SUBSCRIBER INTELLIGENCE by NETSCOUT SYSTEMS, INC. of Westford, Mass. Data presented in the activity map can benefit the service provider by allowing the service provider to pinpoint the cause of connection problems for the subscriber as well as identify behavior of the subscriber's device that may be negatively affecting the network of the service provider.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the present invention is not described with reference to any particular programming language. It will be appreciated that a variety of programming languages may be used to implement the teachings of the present invention as described herein, and any references herein to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention.

What is claimed is:

1. A computer based method for generating an activity map, the method comprising:
    monitoring device activity of a user device connected to a network over a period of time;
    generating an activity indicator bar including a description of the device activity of the user device in a plurality of time periods, each of the time periods of the plurality shorter than the period of time;
    receiving a selection of one or more of the plurality of time periods;
    displaying the activity map simultaneously with the activity indicator bar, the activity map comprising:
    a row in a first direction displaying the selected one or more time periods of the plurality in a first direction of the activity map;
    a summary row in the first direction for displaying activities that occurred in at least one of the selected one or more time periods of the plurality;
    a column displaying (1) a plurality of time intervals and (2) descriptions of parameters associated with each of the plurality of time intervals, the column in a second direction of the activity map, the plurality of time intervals within the selected one or more time periods of the plurality, each of the time intervals shorter in length than each of the selected one or more time periods of the plurality and, wherein the descriptions of parameters include at least one of:
    identification of a network interface over which data has been transmitted, identification of a geographic region in which the user device is located, and an indication of two or more access point names associated with the user device; and
    a state indicator displayed within each of the plurality of time intervals, the state indicator corresponding to the device activity of the user device during each of the plurality of time intervals, wherein device activity indicated by the state indicator includes at least one of a level of data transmitted by the user device and whether an error occurred during one of the plurality of time periods.

2. The method of claim 1, wherein each of the plurality of time periods is fifteen minutes in length.

3. The method of claim 2, wherein each of the plurality of time intervals is fifteen seconds in length.

4. The method of claim 1, wherein the description of device activity includes a level of data transmitted by the user device.

5. The method of claim 1, wherein the description of device activity includes indication of whether an error occurred during one of the plurality of time periods.

6. The method of claim 1, wherein the described parameters include identification of a network interface over which data has been transmitted during the associated one of the second plurality of time periods.

7. The method of claim 1, wherein the described parameters include identification of a geographic region in which the user device is located.

8. The method of claim 1, wherein the described parameters include an indication of two or more access point names associated with the user device.

9. A computer program product for generating an activity map, the computer program product comprising a non-transitory computer-readable storage medium storing instructions that when executed cause at least one processor to:
    monitor device activity of a user device connected to a network over a period of time;
    generate an activity indicator bar including a description of the device activity of the user device in a plurality of time periods, each of the time periods of the plurality shorter than the period of time;
    receive a selection of one or more of the plurality of time periods;
    display the activity map simultaneously with the activity indicator bar, the activity map comprising:
    a row in first direction displaying the selected one or more time periods of the plurality in a first direction of the activity map;
    a summary row in the first direction for displaying activities that occurred in at least one of the selected one or more time periods of the plurality;
    a column displaying (1) a plurality of time intervals and (2) descriptions of parameters associated with each of the plurality of time intervals, the column in a second direction of the activity map, the plurality of time intervals within the selected one or more time periods of the plurality, each of the time intervals shorter in length than each of the selected one or more time periods of the plurality; and, wherein the descriptions of parameters include at least one of:

identification of a network interface over which data has been transmitted, identification of a geographic region in which the user device is located, and an indication of two or more access point names associated with the user device; and a state indicator displayed within each of the plurality of time intervals, the state indicator corresponding to the device activity of the user device during each of the plurality of time intervals, wherein device activity indicated by the state indicator includes at least one of a level of data transmitted by the user device and whether an error occurred during one of the plurality of time periods.

10. The computer program product of claim 9, wherein each of the plurality of time periods is fifteen minutes in length.

11. The computer program product of claim 10, wherein each of the plurality of time intervals is fifteen seconds in length.

12. The computer program product of claim 9, wherein the description of device activity includes a level of data transmitted by the user device.

13. The computer program product of claim 9, wherein the description of device activity includes indication of whether an error occurred during one of the plurality of time periods.

14. The computer program product of claim 9, wherein the described parameters include identification of a network interface over which data has been transmitted during the associated one of the second plurality of time periods.

15. The computer program product of claim 9, wherein the described parameters include identification of a geographic region in which the user device is located.

16. The computer program product of claim 9, wherein the described parameters include an indication of two or more access point names associated with the user device.

17. The method of claim 1, wherein the state indicator includes at least one of an active state, an idle state, a detached state, and an error state.

18. The computer program product of claim 9, wherein the state indicator includes at least one of an active state, an idle state, a detached state, and an error state.

19. The method of claim 1, wherein the described parameters shown in the display include an access point name and at least one of a geographic region and a wireless communication standard.

20. The computer program product of claim 9, wherein the described parameters shown in the display include an access point name and at least one of a geographic region and a wireless communication standard.

* * * * *